US008953531B2

(12) United States Patent
Oh et al.

(10) Patent No.: US 8,953,531 B2
(45) Date of Patent: Feb. 10, 2015

(54) METHOD AND APPARATUS FOR MANAGING RESOURCES FOR P2P COMMUNICATION IN WIRELESS COMMUNICATION SYSTEM

(75) Inventors: Chang-Yoon Oh, Suwon-si (KR); Jung-Je Son, Yongin-si (KR); Kyung-Kyu Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 467 days.

(21) Appl. No.: 13/182,268

(22) Filed: Jul. 13, 2011

(65) Prior Publication Data
US 2012/0014334 A1    Jan. 19, 2012

(30) Foreign Application Priority Data
Jul. 13, 2010    (KR) .................. 10-2010-0067623

(51) Int. Cl.
*H04W 4/00* (2009.01)
*H04W 72/08* (2009.01)
*H04W 76/02* (2009.01)

(52) U.S. Cl.
CPC .......... *H04W 72/085* (2013.01); *H04W 76/023* (2013.01)
USPC ....................................... 370/329; 455/452.1

(58) Field of Classification Search
USPC ......................................... 370/328, 329, 310
See application file for complete search history.

(56) References Cited

U.S. PATENT DOCUMENTS

| 7,283,832 | B2 * | 10/2007 | Jia et al. ........................ 455/517 |
| 8,270,337 | B2 * | 9/2012 | Yu et al. ........................ 370/315 |
| 8,295,241 | B2 * | 10/2012 | Kim et al. ..................... 370/329 |
| 8,300,715 | B2 * | 10/2012 | Li et al. ......................... 375/260 |
| 8,305,972 | B2 * | 11/2012 | Baker et al. ................... 370/329 |
| 8,428,629 | B2 * | 4/2013 | Li et al. ......................... 455/500 |
| 2009/0011770 | A1 * | 1/2009 | Jung et al. ................. 455/452.1 |
| 2009/0016456 | A1 * | 1/2009 | Li et al. ......................... 375/260 |
| 2009/0017807 | A1 * | 1/2009 | Kwon et al. ................... 455/416 |
| 2009/0034447 | A1 * | 2/2009 | Yu et al. ........................ 370/315 |
| 2010/0167719 | A1 * | 7/2010 | Sun et al. ...................... 455/423 |
| 2010/0172267 | A1 * | 7/2010 | Viorel et al. .................. 370/254 |
| 2010/0189046 | A1 * | 7/2010 | Baker et al. ................... 370/329 |
| 2010/0254281 | A1 * | 10/2010 | Kim et al. ..................... 370/252 |
| 2011/0103317 | A1 * | 5/2011 | Ribeiro et al. ................ 370/329 |
| 2011/0228666 | A1 * | 9/2011 | Barbieri et al. ............... 370/216 |
| 2011/0258313 | A1 * | 10/2011 | Mallik et al. .................. 709/224 |
| 2011/0268101 | A1 * | 11/2011 | Wang et al. ................... 370/344 |
| 2011/0282989 | A1 * | 11/2011 | Geirhofer et al. ............. 709/224 |
| 2012/0115518 | A1 * | 5/2012 | Zeira et al. .................... 455/500 |
| 2012/0129562 | A1 * | 5/2012 | Stamoulis et al. ............ 455/517 |
| 2012/0327889 | A1 * | 12/2012 | Sayeedi ........................ 370/329 |

* cited by examiner

*Primary Examiner* — Michael J Moore, Jr.

(57) ABSTRACT

A method and apparatus for managing resources for Peer-to-Peer (P2P) communication in a wireless communication system. A mobile station (MS) attempting to establish P2P communication receives a P2P amble signal transmitted on at least one adjacent P2P link, measures a signal strength for the P2P amble signal, reports the measurement results to a base station (BS), and performs the P2P communication using a P2P resource that is assigned by the BS according to the measurement results. The BS assigns a resource different from the resource assigned to a P2P link having a highest signal strength measured, as a resource for the P2P communication, thereby preventing possible interference caused by adjacent P2P links.

20 Claims, 10 Drawing Sheets

METHOD AND APPARATUS FOR MANAGING RESOURCES FOR P2P COMMUNICATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jul. 13, 2010 and assigned Serial No. 10-2010-0067623, the entire disclosure of which is hereby incorporated by reference.

TECHNICAL FIELD OF THE INVENTION

The present invention relates generally to a wireless communication system, and more particularly, to a method and apparatus for managing resources for Peer-to-Peer (P2P) communication.

BACKGROUND OF THE INVENTION

In cellular mobile communication systems, a Mobile Station (MS) typically communicates with another MS by relaying the communication through a Base Station (BS), even if the MSs are located very close to each other. However, when a distance between two MSs located in the same cell is very short, it may be more reasonable for them to communicate with each other directly rather than relaying through a BS. This technique is called Peer-to-Peer communication, or "P2P" for short. Particularly, an MS for performing P2P communication is called a P2P MS.

Compared with conventional communications performed through a BS, a P2P ad hoc system supporting direct communication between MSs may contribute to the following performance improvements. For example, data traffics such as file transfers, gaming, and video streaming may be directly exchanged between MSs without passing through a BS, thus reducing the load of the BS. The direct communication between MSs without a BS may contribute to a reduction in transmission/reception latency. Even though strength of the signals that MSs receive from a BS is irregular or poor when the MSs are located in a cell edge or a shadowing area, high communication quality may be ensured by the direct communication between MSs.

An example of a P2P ad hoc system may include Wireless Fidelity (Wi-Fi). Compared with Wi-Fi, cellular P2P is advantageous in that a BS may support efficient resource assignment in the process of starting initial P2P communication.

However, in a situation where some resource areas are used as resources for P2P communication in a cellular frame, if a plurality of P2P links are in communication in one cell and particularly, if two different P2P links are located very close to each other, interference may occur between the two P2P links that use the same resources, disturbing seamless P2P communication.

SUMMARY OF THE INVENTION

To address the above-discussed deficiencies of the prior art, it is a primary object to provide a method and apparatus for resolving interference issues occurring between P2P links that use the same resources, in P2P communications.

Another aspect of exemplary embodiments of the present invention is to provide a method and apparatus for efficiently managing resources for P2P communication in a wireless communication system.

In accordance with one aspect of the present invention, there is provided a method for managing resources for peer-to-peer (P2P) communication in a wireless communication system. The method includes receiving, by a mobile station (MS) attempting to establish P2P communication, a P2P amble signal transmitted on at least one adjacent P2P link and measuring a signal strength for the P2P amble signal. The method also includes reporting the measurement results to a base station (BS), and performing the P2P communication using a P2P resource that is assigned by the BS according to the measurement results.

In accordance with another aspect of the present invention, there is provided a method for managing resources for peer-to-peer (P2P) communication in a wireless communication system. The method includes receiving information about a signal strength measured for a P2P amble signal transmitted on at least one adjacent P2P link, from a mobile station (MS) attempting resources for P2P communication. The method also includes assigning a P2P resource for P2P communication to the P2P MS according to the measurement results.

In accordance with another aspect of the present invention, there is provided a mobile station (MS) for managing resources for peer-to-peer (P2P) communication in a wireless communication system. The MS includes a measurer configured to receive a P2P amble signal transmitted on at least one adjacent P2P link and measure a signal strength for the P2P amble signal. The MS also includes a controller configured to report the measurement results to a base station (BS), and perform the P2P communication using a P2P resource that is assigned by the BS according to the measurement results. The MS further includes a transceiver configured to transmit the measurement results to the BS, and receive information about the assigned P2P resource from the BS.

In accordance with yet another aspect of the present invention, there is provided a base station (BS) for managing resources for peer-to-peer (P2P) communication in a wireless communication system. The BS includes a transceiver configured to receive information about a signal strength measured for a P2P amble signal transmitted on at least one adjacent P2P link, from a P2P mobile station (MS). The BS also includes a controller configured to assign a P2P resource for P2P communication to the P2P MS according to the measurement results.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Although reference will be made to communication standards, in which specific message names and terms are used, in the following description of a resource management operation for P2P communication in a wireless communication system, it will be understood by those of ordinary skill in the art that the resource management operation according to the present invention is not limited to specific communication protocols and system configurations, and various changes in form and details may be made therein without departing from the spirit and scope of the invention.

Figure 1:
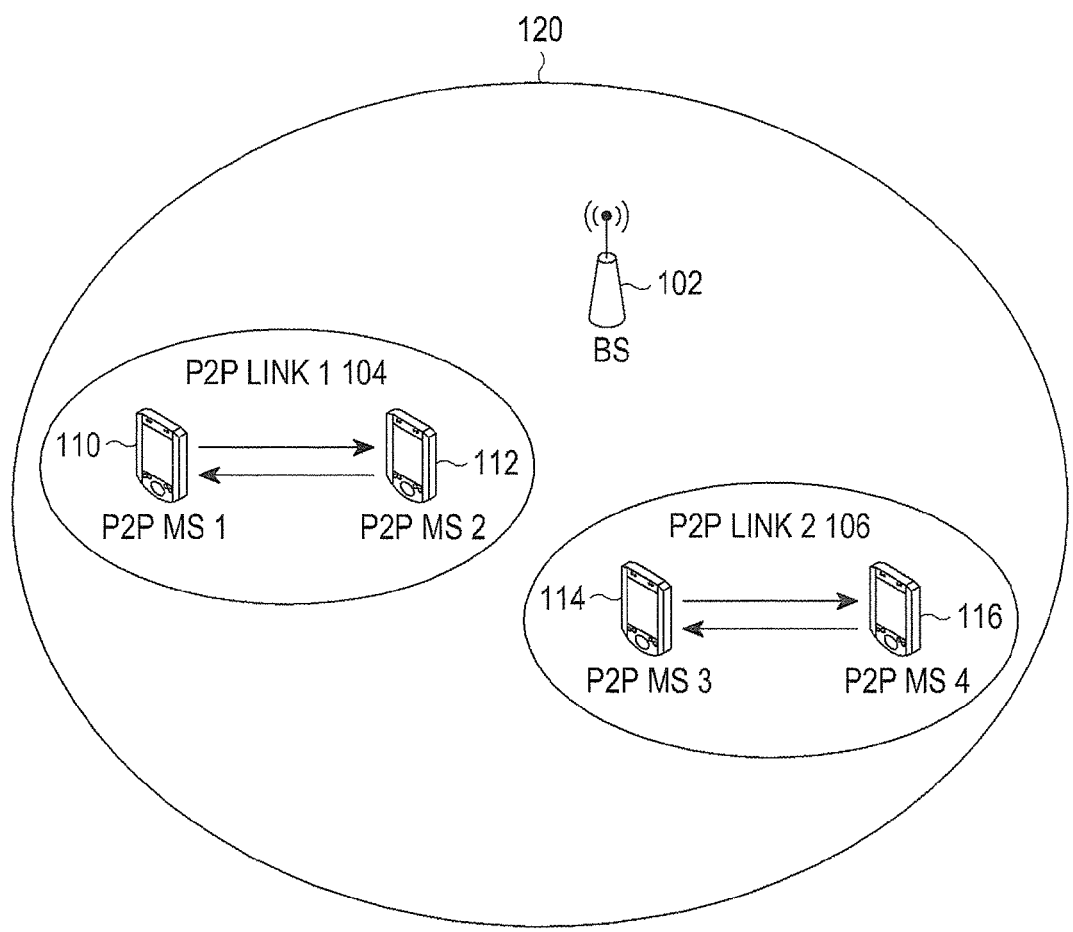
FIG. 1 schematically illustrates P2P communication in a cellular P2P system.

FIG. 1 schematically illustrates P2P communication in a cellular P2P system.

As illustrated, a BS 102 provides service coverage in its cell 120, and manages resource assignment in the cell 120. A plurality of MSs 110, 112, 114, and 116 exist in the cell 120, and they are performing P2P communication through their associated P2P links 104 and 106. Specifically, the adjacent P2P MSs #1 and #2 (110 and 112) communicate with each other through the P2P link #1 104, and the adjacent P2P MSs #3 and #4 (114 and 116) communicate with each other through the P2P link #2 106.

Figure 2:
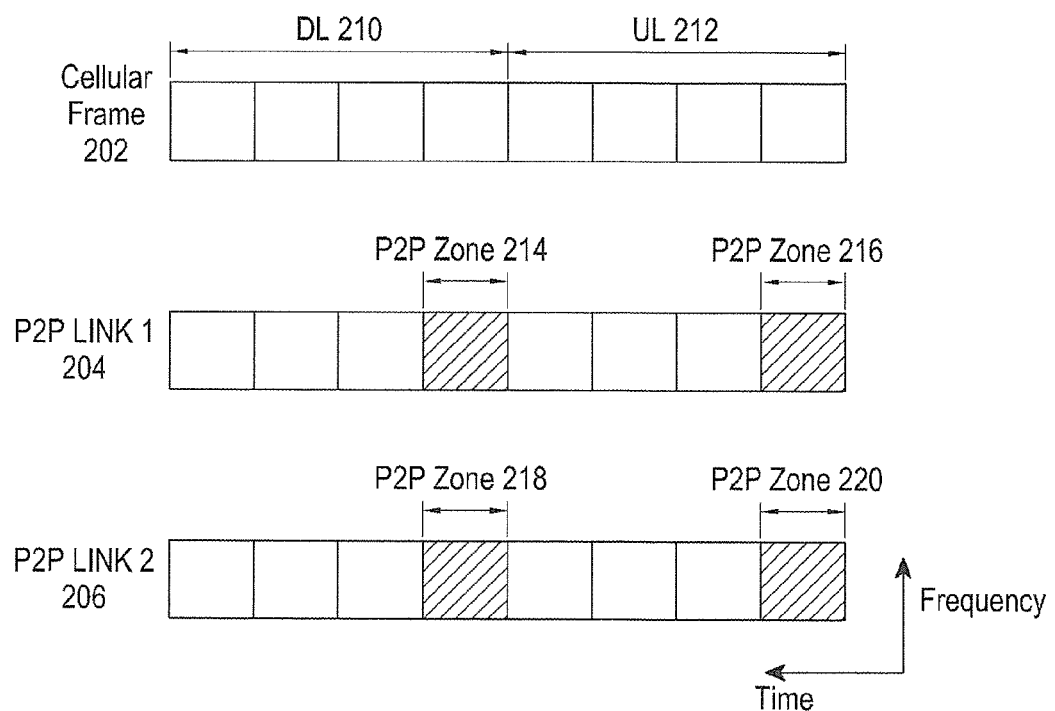
FIG. 2 illustrates an example of resource assignment for P2P communication within one cell.

FIG. 2 illustrates an example of resource assignment for P2P communication within one cell.

Referring to FIG. 2, a cellular frame 202 used in a Time Division Duplex (TDD) mode includes a DownLink (DL) interval 210 and an UpLink (UL) interval 212, each of which includes a plurality of subframes separated in the time domain. Some areas (e.g., one or more predetermined subframes) in each of the intervals 210 and 212 are assigned as P2P zones 214, 216, 218, and 220 for P2P links #1 and #2 (204 and 206).

If a plurality of P2P links are assigned the same resource areas in cellular P2P as described above, interference may occur between the P2P links.

Figure 3:
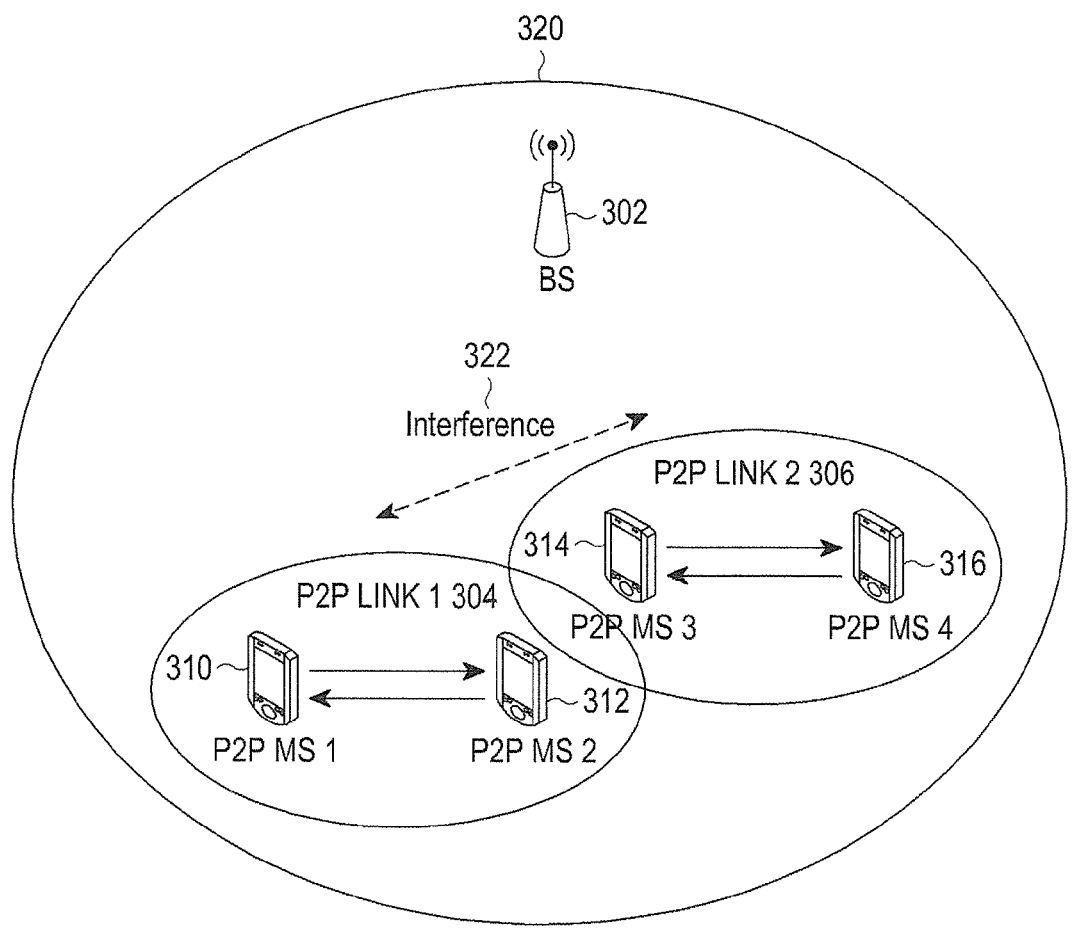
FIG. 3 illustrates interference between P2P links in a cellular P2P system.

FIG. 3 illustrates interference between P2P links in a cellular P2P system.

Referring to FIG. 3, a BS 302 provides service coverage in its cell 320, and manages resource assignment in the cell 320. A plurality of MSs 310, 312, 314, and 316 exist in the cell 320, and they are performing P2P communication through their associated P2P links 304 and 306. Specifically, the P2P MSs #1 and #2 (310 and 312) communicate with each other through the P2P link #1 304, and the P2P MSs #3 and #4 (314 and 316) communicate with each other through the P2P link #2 306.

As illustrated, if the distance between the P2P link #1 304 and the P2P link #2 306 is very short, interference 322 may occur between the P2P links 304 and 306 that use the same resources, disturbing seamless P2P communication.

Therefore, in an embodiment of the present invention, two adjacent P2P links are set to use different resource areas to prevent interference from occurring therebetween.

Figure 4:
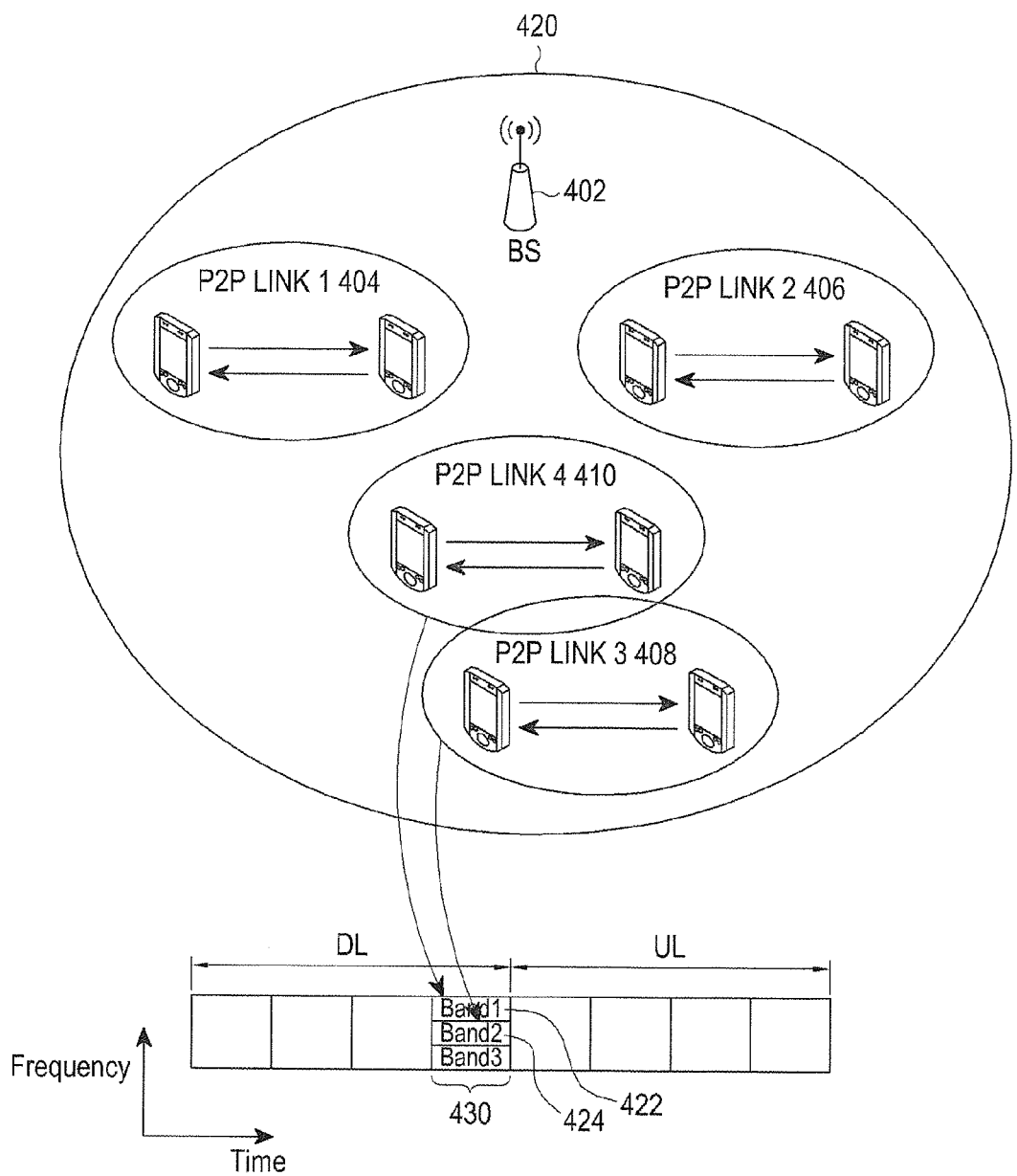
FIG. 4 illustrates resource assignment to P2P links in a cellular P2P system according to an embodiment of the present invention.

FIG. 4 illustrates resource assignment to P2P links in a cellular P2P system according to an embodiment of the present invention.

Referring to FIG. 4, a BS 402 provides service coverage in its cell 420, and manages resource assignment in the cell 420. A plurality of MS pairs, which perform communication through their associated P2P links 404, 406, 408, and 410, are present in the cell 420. While the P2P links #1 and #2 (404 and 406) are located far apart from other P2P links, the P2P links #3 and #4 (408 and 410) are located adjacent to each other, possibly causing interference. In this situation, different resource areas 424 and 422 may be assigned to the P2P links #3 and #4 (408 and 410), respectively, in a P2P zone 430.

For example, the different resource areas may be separated in the frequency domain or the time domain.

Figure 5:
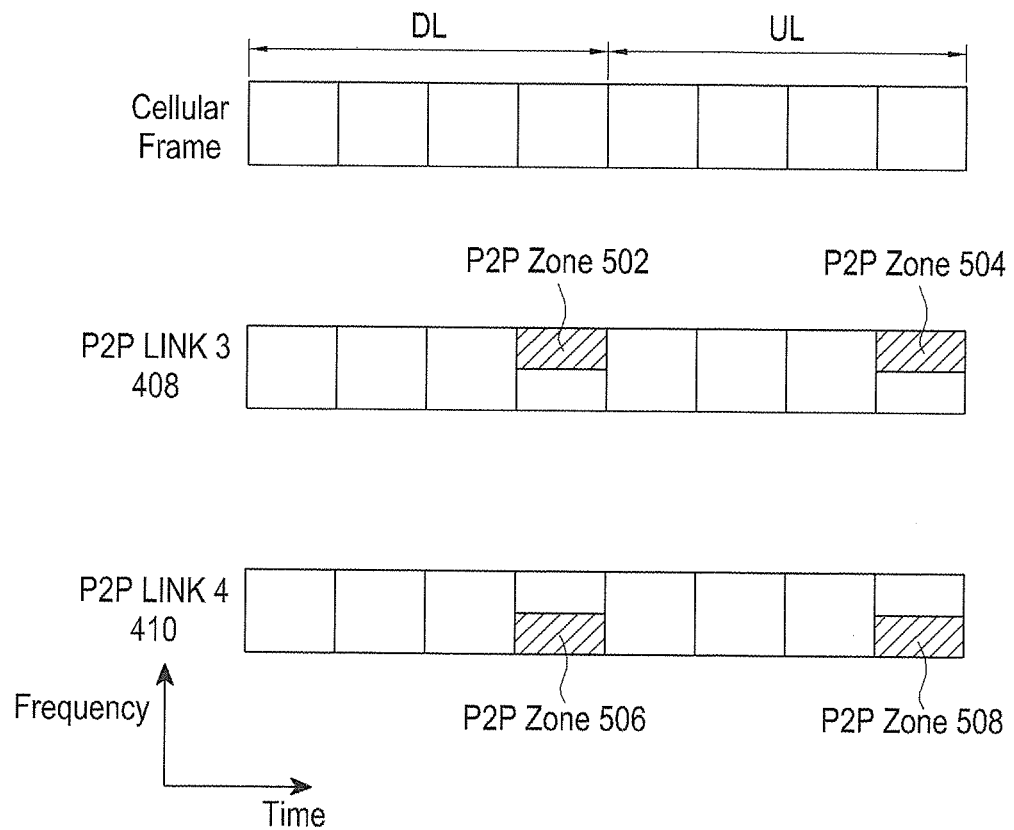
FIG. 5 illustrates an example of P2P resource areas separated in the frequency domain according to an embodiment of the present invention.

FIG. 5 illustrates an example of P2P resource areas separated in the frequency domain according to an embodiment of the present invention.

As illustrated, high frequency bands are assigned to the P2P link #3 408 as P2P zones 502 and 504 in DL/UL intervals, respectively, whereas low frequency bands are assigned to the P2P link #4 410 as P2P zones 506 and 508 in DL/UL intervals, respectively.

Figure 6:
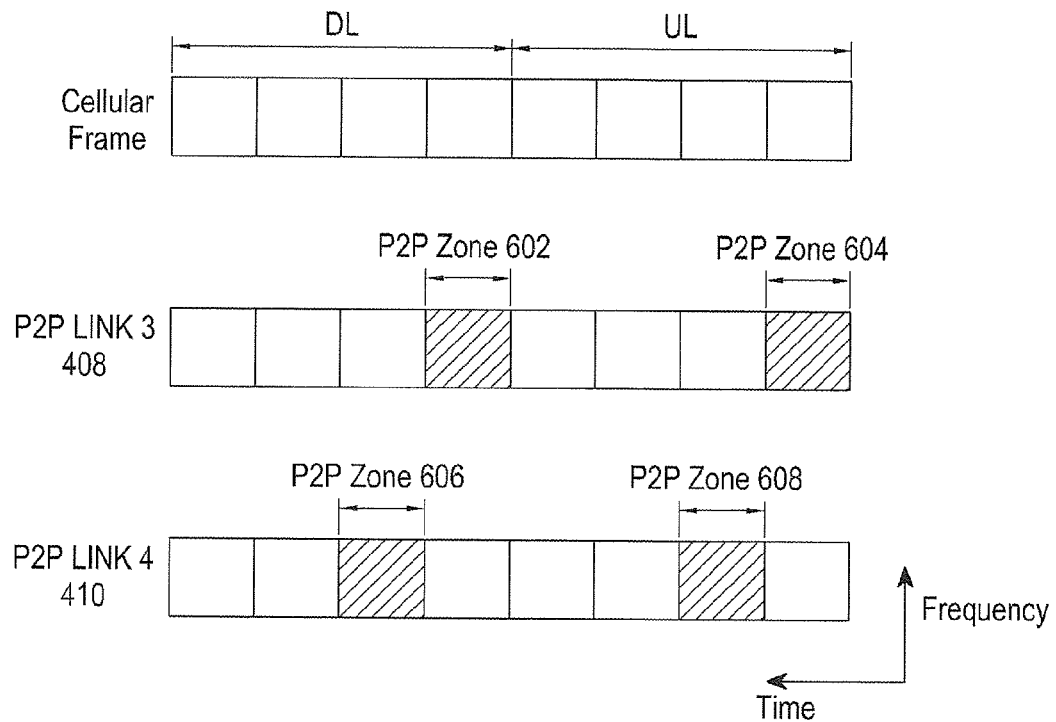
FIG. 6 illustrates an example of P2P resource areas separated in the time domain according to another embodiment of the present invention.

FIG. 6 illustrates an example of P2P resource areas separated in the time domain according to another embodiment of the present invention.

As illustrated, first subframes are assigned to the P2P link #3 408 as P2P zones 602 and 604 in DL/UL intervals, respectively, whereas second subframes are assigned to the P2P link #4 410 as P2P zones 606 and 608 in DL/UL intervals, respectively.

In an alternative embodiment, different two-dimensional resource areas may be assigned to adjacent P2P links. Hence, it should be noted that the different resource areas are not limited by specific resource types.

Each MS participating in P2P communication uses some of cellular preambles used in a cellular network as a P2P amble sequence. In other words, each MS may transmit a P2P amble sequence, and monitor P2P amble sequences transmitted from other MSs, thereby detecting the presence and signal strength of the other MSs.

In an embodiment of the present invention, each P2P MS measures strength of a P2P amble signal transmitted on an adjacent P2P link, and reports information about the measured strength of the P2P amble signal, to a BS. In an embodiment, in the process of reporting strength of adjacent P2P amble signals to a BS, a P2P MS may report at least one P2P amble index having higher signal strength. For example, P2P amble indexes for a predetermined number of P2P amble signals having high signal strength are reported to a BS. Based on the reported P2P link-specific signal strength, the BS assigns resources to be used for a P2P link to the P2P MS that has reported the information. Specifically, the BS may assign the resources, which are unlikely to cause significant interference between adjacent P2P links, to P2P MSs as P2P resources.

Figure 7:
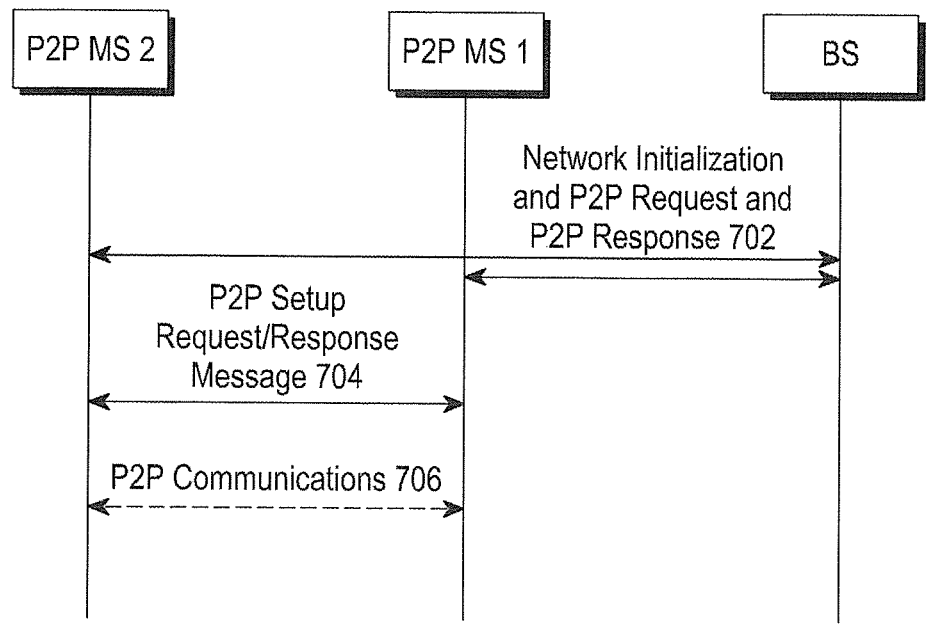
FIG. 7 briefly illustrates a procedure for initiating P2P communication according to an embodiment of the present invention.

FIG. 7 briefly illustrates a procedure for initiating P2P communication according to an embodiment of the present invention.

Referring to FIG. 7, in block 702, MSs in a cell perform the same network entry procedure as that defined in the cellular system. The network entry procedure includes performing cell search, channel information reception, and initial ranging, and means operations that MSs use to access the network. In block 704, a P2P MS attempting P2P communication sends a message (e.g., P2P request message) for requesting P2P communication, to a BS. The P2P request message includes, for example, a P2P MS ID as information about the counterpart P2P MS with which the P2P MS is attempting to communicate. Upon receiving the P2P request message, the BS determines whether the counterpart P2P MS exists in its cell. If necessary, the BS may instruct the counterpart P2P MS to prepare for P2P communication by sending an appropriate message to the counterpart P2P MS. Thereafter, the BS sends a response message (e.g., P2P response message) to the P2P request message, to the P2P MS. The P2P response message indicates whether the requested P2P communication is allowable.

If the P2P response message indicates that P2P communication is allowable, the P2P MS may start P2P communication with the counterpart P2P MS using predetermined resource areas in block 706. To start the P2P communication, the P2P MS may exchange P2P communication start messages (e.g., a P2P setup request message and a P2P setup response message) with the counterpart P2P MS in block 704.

In the cellular system, for the same purpose as that of a Synchronization Channel (SCH) used for communication between a BS and an MS, i.e., for synchronization, a P2P SCH is used for P2P communication. The P2P SCH carries a P2P amble signal including a P2P amble sequence. One of the P2P MSs constituting a P2P link serves as a master MS and transmits a P2P amble signal. The master MS may be determined during or after P2P communication setup, i.e., a P2P request/response procedure for exchanging P2P request/response messages. When exchanging P2P request/response messages with the BS, the P2P MS acquires P2P system information such as P2P SCH information used for P2P communication. For example, the P2P SCH information includes location information of a P2P SCH in a frame, and P2P amble set information indicating P2P amble sequences transmitted in the P2P SCH. The master MS transmits a P2P amble signal over a P2P SCH based on the P2P system information, and each P2P MS measures a channel state for each P2P amble in the P2P amble set using the P2P SCH based on the P2P system information.

In an alternative embodiment, a P2P MS may acquire P2P system information based on system information broadcasted from a BS, or acquire the P2P system information through other routes.

Figure 8:
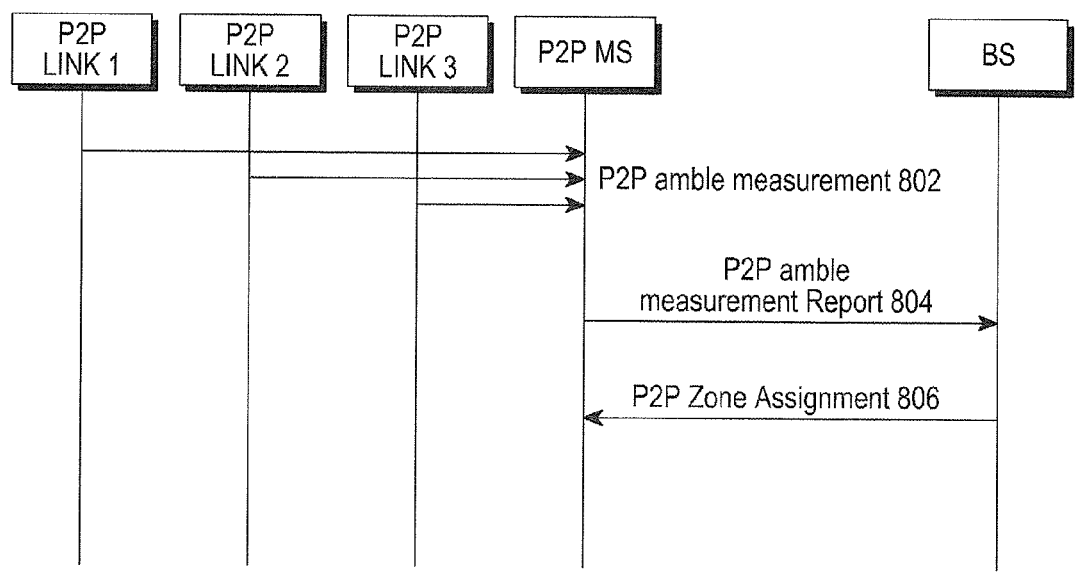
FIG. 8 illustrates a resource assignment procedure for P2P communication according to an embodiment of the present invention.

FIG. 8 illustrates a resource assignment procedure for P2P communication according to an embodiment of the present invention.

Referring to FIG. 8, in block 802, a P2P MS attempting to establish P2P communication or a P2P MS attempting to be assigned resources for P2P communication may initially monitor P2P amble signals transmitted on the surrounding P2P links to measure channel information (e.g., signal strength) of the P2P amble signals. Specifically, a P2P MS receives P2P amble signals transmitted by master MSs that have established nearby P2P links through a P2P SCH, based on the P2P system information the P2P MS has acquired in the process of exchanging P2P request/response messages with a BS. The P2P MS may receive all P2P amble signals it can receive based on the P2P system information.

In block 804, the measured signal strengths are reported to the BS using a P2P amble measurement report message. For example, the P2P amble measurement report message may include channel information (e.g., signal strength) for each of all the P2P amble sequences measured by the P2P MS. In an alternative embodiment, the P2P amble measurement report message may include channel information (e.g., signal strength) for each of at least some of the P2P amble sequences measured by the P2P MS. For example, P2P amble indexes for a predetermined number of P2P amble sequences having the best channel state, or the highest signal strength, are reported to the BS using the P2P amble measurement report message.

In block 806, the BS assigns resources to be used for a P2P link to the P2P MS based on the channel information included in the P2P amble measurement report message, and transmits the assigned resources to the P2P MS using a P2P zone assignment message. If the P2P amble measurement report message indicates a P2P amble sequence having the highest signal strength, the BS assigns resources other than the resources assigned to a P2P link having the P2P amble sequence, to the P2P link for the P2P MS, thereby making it possible to avoid interference caused by the P2P link having the P2P amble sequence.

Figure 9:
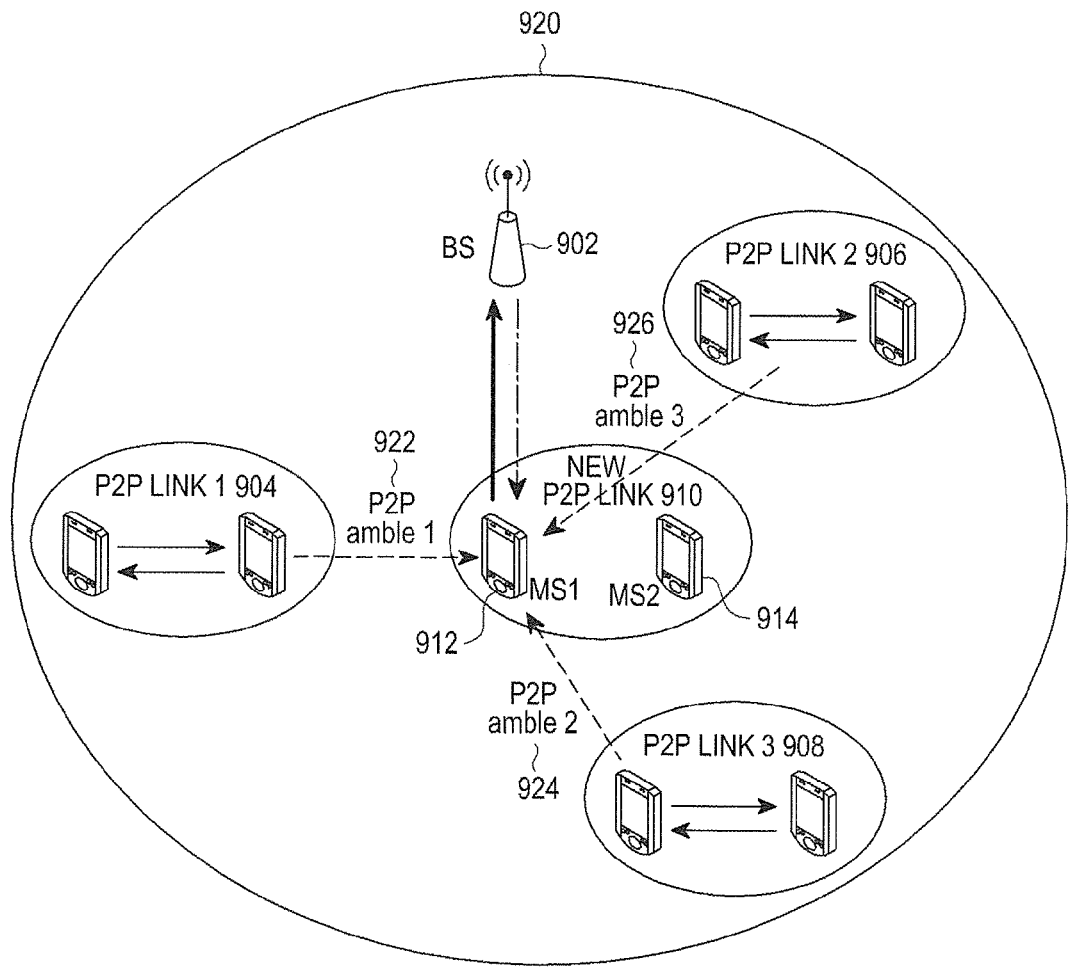
FIG. 9 illustrates an example of resource assignment for P2P communication according to an embodiment of the present invention.

FIG. 9 illustrates an example of resource assignment for P2P communication according to an embodiment of the present invention.

Referring to FIG. 9, a BS 902 provides service coverage in its cell 920, and manages resource assignment in the cell 920. A plurality of MS pairs, which perform communication through their associated P2P links 904, 906, and 908, are present in the cell 920. An MS 912 attempting to be assigned resources for a new P2P link 910 between the MS 912 and the counterpart P2P MS, acquires P2P system information from the BS 902, and monitors P2P amble signals 922, 924, and 926 transmitted on P2P links #1, #2 and #3 (904, 906, and 908) based on the P2P system information, to measure their signal strengths.

Information about the highest signal strength among the measured signal strengths is delivered to the BS 902 using a P2P measurement report message, and the BS 902 assigns resources different from the resources assigned to a P2P link having a P2P amble index for the highest signal strength included in the P2P measurement report message, to the P2P link 910 for the P2P MS 912. For example, if first P2P zones 502 and 504 in FIG. 5 are assigned to the P2P link #3 908 and the signal strength for the P2P link #3 908 is measured highest by the P2P MS 912, the BS 902 assigns second P2P zones 506 and 508 located in resource areas different from those of the P2P zones 502 and 504, to the P2P link 910 for the P2P MS 912. Resource assignment information for the second P2P zones 506 and 508 is delivered from the BS 902 to the P2P MS 912 using a P2P zone assignment message.

Figure 10:
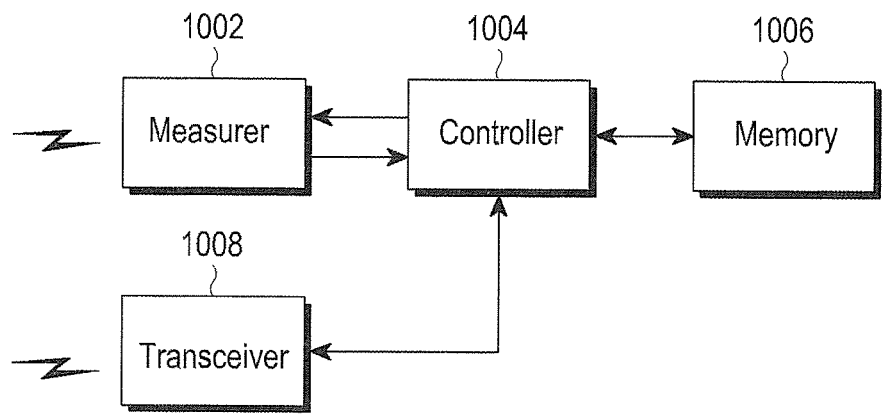
FIG. 10 illustrates a structure of an MS according to an embodiment of the present invention.

FIG. 10 illustrates a structure of an MS according to an embodiment of the present invention.

As illustrated, the MS includes a measurer 1002, a controller 1004, a memory 1006, and a transceiver 1008.

Referring to FIG. 10, the controller 1004 acquires P2P system information, especially P2P SCH information from a BS through the transceiver 1008, and instructs the measurer 1002 to receive and measure a P2P amble signal transmitted from a master MS on another P2P link based on the P2P SCH information. The measurer 1002 measures signal strengths for other P2P links according to the instruction from the controller 1004, and reports the measured signal strengths to the controller 1004.

The controller 1004 generates a P2P measurement report message according to the measured signal strengths, and sends the generated P2P measurement report message to the BS through the transceiver 1008. The controller 1004 receives a P2P zone assignment message from the BS through the transceiver 1008, and recognizes P2P resources assigned for P2P communication. The memory 1006 stores and manages program codes and parameters that the controller 1004 uses to perform its operations. The transceiver 1008, under control of the controller 1004, performs communication with the counterpart P2P MS using the assigned P2P resources.

Figure 11:
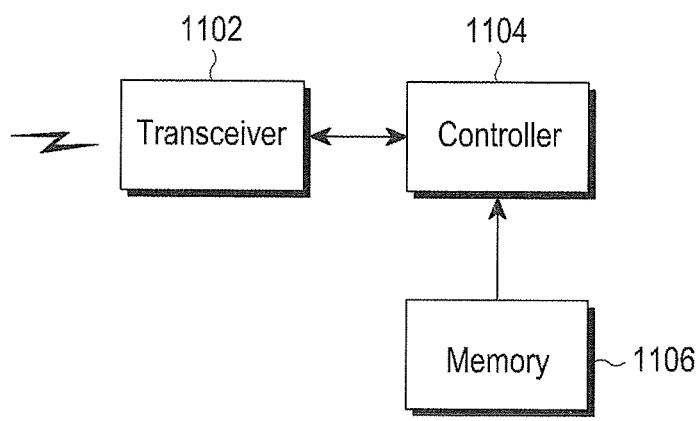
FIG. 11 illustrates a structure of a BS according to an embodiment of the present invention.

FIG. 11 illustrates a structure of a BS according to an embodiment of the present invention.

As illustrated, the BS includes a controller 1104, a memory 1106, and a transceiver 1102.

Referring to FIG. 11, the controller 1104 assigns P2P resources for a P2P MS taking into account channel information for another P2P link, acquired from the P2P MS in a cell through the transceiver 1102, and transmits information about the assigned P2P resources to the P2P MS through the transceiver 1102, using a P2P zone assignment message. The memory 1106 stores and manages program codes and parameters that the controller 1104 uses to perform its operations.

As is apparent from the foregoing description, the present invention may perform seamless P2P communication without interference between P2P links in a broadband wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing resources for peer-to-peer (P2P) communication in a wireless communication system, the method comprising:
   receiving, by a first mobile station (MS) attempting to establish a first P2P communication, a P2P amble signal transmitted on at least one P2P link performing a second P2P communication between different MSs and measuring signal strengths for P2P amble signals;
   reporting, by the first MS, the measurement results to a base station (BS); and
   performing, by the first MS, the first P2P communication using a P2P resource that is assigned by the BS considering the measurement results for the at least one P2P link.

2. The method of claim 1, wherein the reporting comprises transmitting to the BS a P2P amble index for a P2P amble signal having a highest signal strength measured.

3. The method of claim 1, wherein the assigned P2P resource is different from a resource assigned to a P2P link having a highest signal strength measured among the measurement results.

4. The method of claim 1, further comprising receiving, from the BS, P2P synchronization channel (SCH) information used to receive the P2P amble signal.

5. The method of claim 4, wherein the measuring comprises measuring signal strengths for P2P amble signals having P2P amble sequences included in a P2P amble set in the P2P SCH information.

6. A method for managing resources for peer-to-peer (P2P) communication in a wireless communication system, comprising:
   receiving information about a signal strength measured for a P2P amble signal transmitted on at least one P2P link performing a second P2P communication between different mobile stations (MSs), from a first mobile station attempting to establish a first P2P communication; and
   assigning a P2P resource for the first P2P communication to the first MS considering the measurement results for the at least one P2P link.

7. The method of claim 6, wherein the information about the signal strength comprises a P2P amble index for a P2P amble signal having a highest signal strength measured by the first MS.

8. The method of claim 6, wherein the assigned P2P resource is different from a resource assigned to a P2P link having a highest signal strength measured among the measurement results.

9. The method of claim 6, further comprising transmitting, to the first MS, P2P synchronization channel (SCH) information used to receive the P2P amble signal.

10. The method of claim 6, wherein the P2P SCH information comprises a P2P amble set representing P2P amble sequences to be measured by the first MS.

11. A mobile station (MS) for managing resources for peer-to-peer (P2P) communication in a wireless communication system, the MS comprising:
   a measurer configured to receive a P2P amble signal transmitted on at least one P2P link performing a second P2P communication between different MSs and measure signal strengths for P2P amble signals;
   a controller configured to report the measurement results to a base station (BS), and perform a first P2P communication using a P2P resource that is assigned by the BS considering the measurement results for the at least one P2P link; and a transceiver configured to transmit the measurement results to the BS, and receive information about the assigned P2P resource from the BS.

12. The MS of claim 11, wherein the controller transmits to the BS a P2P amble index for a P2P amble signal having a highest signal strength measured.

13. The MS of claim 11, wherein the assigned P2P resource is different from a resource assigned to a P2P link having a highest signal strength measured among the measurement results.

14. The MS of claim 11, wherein the transceiver receives, from the BS, P2P synchronization channel (SCH) information used to receive the P2P amble signal, and delivers the P2P SCH information to the controller.

15. The MS of claim 14, wherein the measurer measures signal strengths for P2P amble signals having P2P amble sequences included in a P2P amble set in the P2P SCH information.

16. A base station (BS) for managing resources for peer-to-peer (P2P) communication in a wireless communication system, comprising:

a transceiver configured to receive information about a signal strength measured for a P2P amble signal transmitted on at least one P2P link performing a second P2P communication between different mobile stations (MSs), from a first mobile station (MS) attempting to establish a first P2P communication; and a controller configured to assign a P2P resource for the first P2P communication to the first MS considering the measurement results for the at least one P2P link.

17. The BS of claim 16, wherein the information about the signal strength comprises a P2P amble index for a P2P amble signal having a highest signal strength measured by the first MS.

18. The BS of claim 16, wherein the assigned P2P resource is different from a resource assigned to a P2P link having a highest signal strength measured among the measurement results.

19. The BS of claim 16, wherein the transceiver transmits, to the first MS, P2P synchronization channel (SCH) information used to receive the P2P amble signal.

20. The BS of claim 16, wherein the P2P SCH information comprises a P2P amble set representing P2P amble sequences to be measured by the first MS.

* * * * *